United States Patent [19]

Shannon et al.

[11] Patent Number: 5,485,177
[45] Date of Patent: Jan. 16, 1996

[54] MATRIX DISPLAY DEVICE WITH WRITE-IN FACILITY

[75] Inventors: John M. Shannon, Whyteleafe; Alan G. Knapp, Crawley, both of United Kingdom

[73] Assignee: U.S. Philips Corporation, New York, N.Y.

[21] Appl. No.: 797,852

[22] Filed: Nov. 26, 1991

[30] Foreign Application Priority Data

Dec. 19, 1990 [GB] United Kingdom ............... 9027481

[51] Int. Cl.⁶ ........................................... G09G 3/28
[52] U.S. Cl. ........................................ 345/182; 345/207
[58] Field of Search ................................ 340/707, 784,
340/784 DI, 784 E, 712; 345/173, 175, 179, 182, 207, 104

[56] References Cited

U.S. PATENT DOCUMENTS

| | | | |
|---|---|---|---|
| 4,345,248 | 8/1982 | Togashi et al. | 340/784 |
| 4,430,648 | 2/1984 | Togahi et al. | 340/784 E |
| 4,582,395 | 4/1986 | Morozumi | 340/784 |
| 4,655,552 | 4/1987 | Togashi et al. | |
| 4,846,559 | 7/1989 | Kniffler | 350/342 |
| 5,151,688 | 9/1992 | Tanaka et al. | 340/712 |
| 5,204,661 | 4/1993 | Hack et al. | 345/179 |

Primary Examiner—Tommy P. Chin
Assistant Examiner—Gin Goon
Attorney, Agent, or Firm—Robert J. Kraus

[57] ABSTRACT

An active matrix liquid crystal display device in which an array of picture elements which include respective switching means, e.g. TFTs, are driven a row at a time by drive signals supplied via a set of row and a set of column address conductors. The device also includes an array of active addressed sensing elements each consisting of a photosensitive element, e.g. a thin film photoresistor or photodiode, a charge storage capacitor and a switching device, e.g. a TFT. The sensing element connected to respective row and column address conductors. The charge storage capacitors are periodically charged through operation of their associated switching devices by the drive signals and are selectively discharged via their associated photosensitive element when illuminated by, for example, a light pen. The states of the charge storage capacitors of all of the sensing elements are determined, one row at a time, by a detection circuit connected to the column address conductors during each display field period in synchronism with the driving of the rows of picture elements.

25 Claims, 3 Drawing Sheets

MATRIX DISPLAY DEVICE WITH WRITE-IN FACILITY

BACKGROUND OF THE INVENTION

This invention relates to a matrix display device for displaying information which includes optical sensing means for enabling input of information as well, for example, by way of a light pen. More particularly, the invention is concerned with an active matrix liquid crystal display device comprising a display panel having an array of picture elements each comprising a liquid crystal display element and an associated switching means, sets of row and column address conductors connected to the picture elements and drive means for applying drive signals to the sets of conductors for driving the picture elements, the display panel further including an array of active addressed sensing elements each comprising a photo-sensitive element and a switching device.

Examples of display devices of the above kind are disclosed in U.S. Pat. No. 4,345,248 which also describes typical uses, for instance as an output/input interface for a computer system through which data can be entered by writing with a light pen.

In these known examples, the display device consists of an active matrix liquid crystal display panel of generally conventional form having a row and column array of display elements connected to sets of row and column address conductors through respective thin film transistors (TFTs). The display elements are driven in formal fashion by applying a selection (gating) signal to each row conductor at a time in turn so as to turn on the TFTs of the picture elements associated with that row whereby data signals present on the column conductors are transferred to electrodes of the respective display elements in the row to produce the required display effect. A sensing element, comprising a photodiode and a TFT, is provided for each picture element. The picture element TFTs, display element electrodes, the sense element TFTs and photoelectric elements, and the row and column address conductors are all formed on a common substrate of the display panel. The sense elements are operated in a similar fashion to the picture elements with a gating signal being applied to the TFTs of each row of sense elements in turn so as to turn those TFTs on and connect the photoelectric elements of the row of sense elements to a detection circuit which is responsive to an increase in the conductance of a photoelectric element caused by illumination from the light pen. Consequently, for an input to be detected the illumination of a sense element must coincide with the gating of the TFT of the sense element concerned. The display device is operated such that the display and sense functions are performed in separate frame periods. A basic frame interval is divided into a display frame interval, during which all rows of the picture elements are addressed with display information, followed by a light detection frame interval during which the conditions of the rows of sense elements are detected. Thus there will be some time delay between successive addressing of any one sense element. Because the presence of the light pen at a particular sense element can only be detected if it is at that sense element when the sense element is addressed, then consequently for fast pen movements only a few points of movement will be detected. Moreover, because the device is operated using alternate, and temporally separate, display and detection frame intervals, the drive circuitry for the device becomes complicated and the quality of the display output is likely to be impaired. In one described embodiment, display and detection functions can be performed at the same time by using further sets of row and column conductors dedicated to the sense elements and separate from the row and column address conductors of the display elements so that the display and sense elements can be addressed independently of each other. However, the increase in the numbers of address conductors then required complicates fabrication and can lead to problems with yields.

SUMMARY OF THE INVENTION

It is an object of the present invention to provide an improved display device having an input facility.

More particularly, it is an object of the present invention to provide a display device which can sense accurately and reliably input points from a moving input means, such as a light pen.

It is another object of the present invention to provide an improved display device having an input facility which is of simple construction and which can be manufactured easily and with high yield.

According to the present invention there is provided an active matrix liquid crystal display device as described in the opening paragraph which is characterised in that the sensing elements each include a charge storage means which is connected to the switching device, in that the switching devices are operable by the drive signals applied to the row and column address conductors so as to charge the charge storage means, in that the photo-sensitive element of each sensing element is arranged so as to discharge the charge storage means in response to the illumination thereof, and in that the device includes detection means connected to the sensing elements for periodically detecting the state of charge of their charge storage means.

With such a device, each sensing element has in effect a sense memory function by virtue of its charge storage means. The state of the sensing element is changed following the operation of its switching device by the drive signals to charge its charge storage means, upon being illuminated by, for example, a light pen. The change in state of the sensing element can thus be detected after the event. This detection is therefore not dependent on the simultaneous illumination of the sensing element but can be carried out in a detection period to determine those sensing elements which have been subjected to illumination at some earlier time. Consequently, the possibility of illuminated sensing elements being undetected due to fast movement of the light pen is avoided.

By arranging that the drive signals applied to the row and column address conductors for display purposes are used also to drive the sensing elements, a significant simplification of the necessary circuit is obtained.

The drive means is preferably arranged in accordance with conventional practice to apply display data signals to the column address conductors and a selection signal to each row address conductor in turn so as to operate the switching means of the row of picture elements associated with the row address conductor to apply the data signals to their respective display elements. Conveniently then, in a similar manner, the switching devices of each row of sensing elements are preferably operable by a selection signal applied to an associated row address conductor so as to charge the charge storage means of the sensing elements according to the display data signals which are present on the associated column address conductors.

The charge storage means of each sensing element preferably comprises a capacitor which is connected between the switching device and a reference potential, which may be a row address conductor adjacent to that associated with the sensing element's switching device, or a source of predetermined potential comprising an auxiliary row conductor common to all sensing elements in a row.

The charge storage means may comprise a capacitor formed separately of the photo-sensitive element or alternatively may be constituted by the self capacitance of the photo-sensitive element.

Preferably, the detection means is arranged to determine the state of the sensing elements during a display field. The detection means may be operable to determine the state of row of a sensing elements associated with a row address conductor each time a drive signal is applied to that conductor. To this end, each row address period which is determined by the duration of a row selection signal applied by the drive means to each row address conductor, may be divided into a detection interval during which the state of a sensing element associated with that row address conductor is determined, followed by a drive interval during which data signals for the associated row of picture elements are applied to the column address conductors. The sensing elements thus may be driven at a rate corresponding to the driving of the picture elements, that is, each sensing element is driven once per display field period of the picture elements. Similarly, the state of the sensing elements is detected at the same rate, that is once every display field period. The interval between driving and detecting is approximately one field period. The display and sense functions of the device may therefore be performed concurrently with each picture element and each sensing element being addressed once in every successive field period.

Preferably, the detection means is arranged to detect the charge state of the charge storage means of a sensing element by measuring the charging characteristic of the charge storage means in response to the application thereto of a predetermined potential. In this way, the detection of illuminated sensing elements can be accomplished in a simple and convenient manner.

BRIEF DESCRIPTION OF THE DRAWING

A display device in accordance with the present invention will now be described, by way of example, with reference to the accompanying drawings, in which.

DESCRIPTION OF THE PREFERRED EMBODIMENTS

Figure 1:
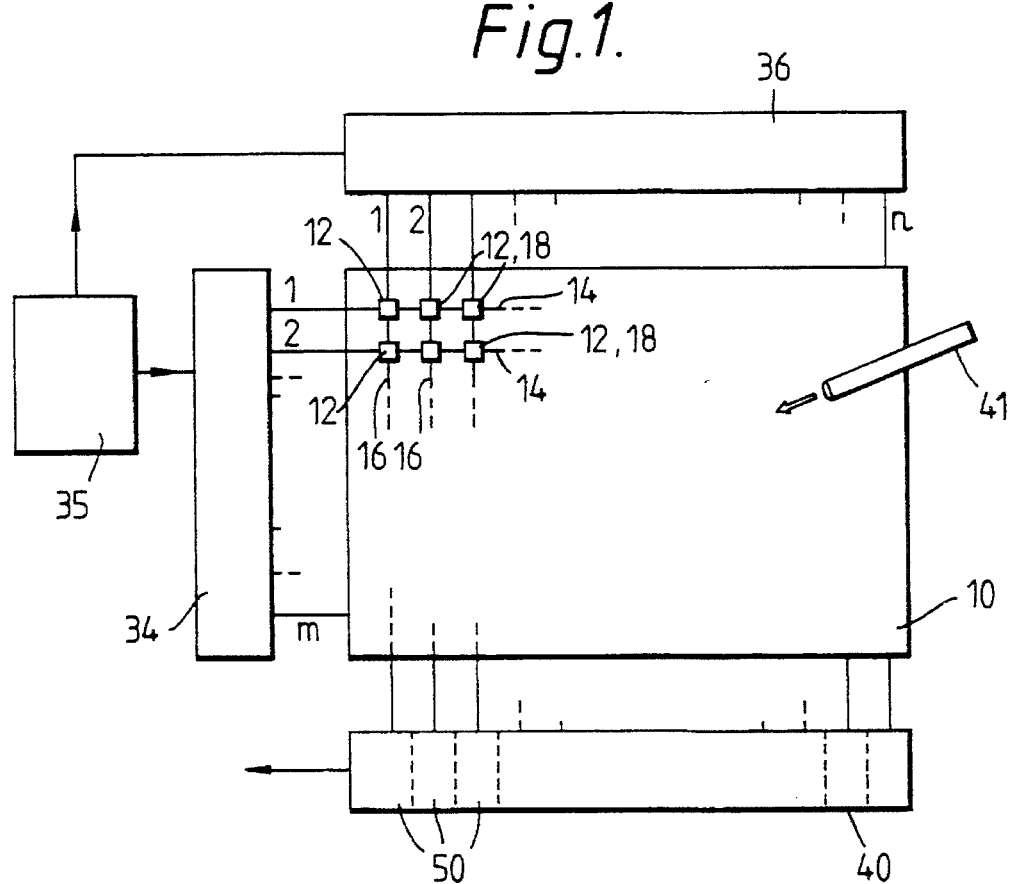
FIG. 1 is a schematic diagram of the display device.

It should be understood that the Figures are merely schematic and are not drawn to scale. In particular certain dimensions may have been exaggerated while other dimensions may have been reduced. It should also be understood that the same reference numerals are used throughout the drawings to indicate the same or similar parts.

Referring to FIG. 1, the display device is an active matrix addressed liquid crystal display device comprising a display panel, 10, having a row and column array of individually operable picture elements which consists of m rows (1 to m) with n horizontally arranged picture elements (1 to n) in each row. Each picture element, referenced at 12, is located at a respective intersection between crossing sets of m row address conductors 14 and n column address conductors 16. Only a few of the picture elements are shown in FIG. 1, for clarity. In practice the total number of picture elements in the matrix array (m×n) may be several hundreds of thousands. The display device is suitable to provide a datagraphic display or a picture display.

The display panel 10 further includes a matrix array of sensing elements 18, there being one sensing element located adjacent each picture element 12, except for the first column of picture elements, giving a high resolution sensing capability.

Figure 2:
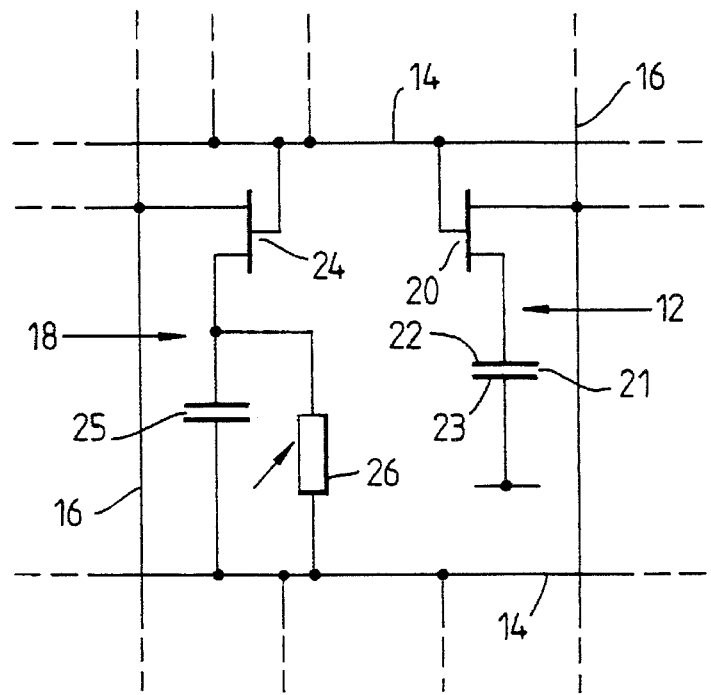
FIG. 2 is a schematic circuit diagram of a part of a display panel of the display device showing typical picture and sensing elements of the panel.

The circuit of a typical combination of picture and sensing elements is shown in FIG. 2. Each picture element 12 comprises a switching device in the form of a thin film field effect transistor, TFT, 20 connected with a liquid crystal display element 21, the impedance of the display element being represented by a capacitor. The gates of all TFTs 20 of the picture elements in one row are connected to a respective one of the row address conductors 14. The sources of all TFTs 20 of picture elements in one column are connected to a respective one of the column address conductors 16. The drain terminals of the TFTs 20 are connected to a first electrode 22 of their associated display elements 21. As in standard practice in matrix liquid crystal display devices using TFT switches, the sets of row and column address conductors 14 and 16, the TFTs 20, and the display element first electrodes 22 are all carried on a transparent supporting plate of insulating material, for example, glass. The display panel 10 comprises a second transparent supporting plate arranged parallel to, and spaced from, this supporting plate, which second plate carries a continuous transparent conductive layer constituting an electrode, 23, common to all display elements. Twisted nematic liquid crystal material is disposed between the two plates, the plates being sealed together around their periphery. Each liquid crystal display element thus consists of a first electrode, 22, connected to an associated TFT 20, an opposing portion of the common electrode 23, and liquid crystal material therebetween. The opposing plates are provided internally with orientation layers and externally with polarising layers in the usual manner.

Each sensing element 18 comprises a switching device in the form of a TFT 24. In similar manner to the TFTs 20 of the picture elements, the gates of all TFTs 24 of sensing elements in the same row are connected to a respective one of the row address conductors 14 and the sources of all TFTs 24 of sensing elements in the same column are connected to a respective one of the column address conductors 16. The drain of the TFT 24 of a sensing element is connected to one side of a charge storage device 25 in the form of a capacitor. The other side of the capacitor is connected to an adjacent row address conductor 14 associated with the next row of picture/sensing elements. In an alternative arrangement the capacitor of a sensing element may instead be connected to a dedicated auxiliary row conductor (not shown) other than the row conductor 14 and which extends in the row direction parallel to and between adjacent row address conductors 14 and which is common to the capacitors of all sensing elements in a row. With this arrangement it is possible to control more easily the potential applied to this side of the capacitor, although it requires the provision of a set of such auxiliary row conductors, corresponding in number to the number of rows of sensing elements, in addition to the row address conductors. In a further alternative arrangement, the source of the TFT 24 may be connected to the same column address conductor 16 as the TFT 20 rather than an adjacent column conductor, as shown.

Figure 3:
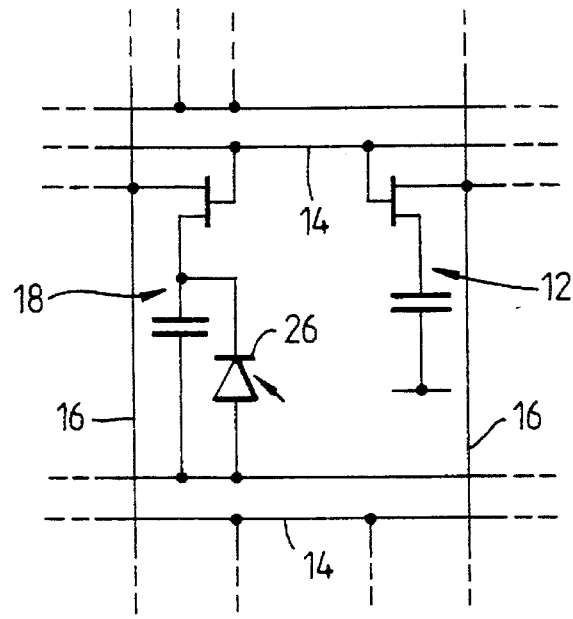
FIG. 3 is similar to FIG. 2 but illustrates an alternative form of sensing element.

The sensing element 18 further includes a photosensitive element 26 which is connected across the capacitor 25 between the drain of the TFT 24 and the next row address conductor 14 (or supplementary row conductor if used). In this embodiment the photosensitive element 26 comprises a photoresistor. The photosensitive element can comprise other forms of photo conductive device which exhibit an increase in conductance in response to being illuminated. For example, a photo-diode, comprising a pin, nip, Schottky, or the like photo-diode may be used, as is shown in the circuit for an alternative form of sensing element illustrated in FIG. 3, and which also uses the aforementioned supplementary conductor scheme. All such photosensitive elements can be fabricated using thin film processes. Alternatively, each element 18 can comprise a TFT whose source is connected to the next row conductor or an auxiliary row conductor and whose gate is connected to its drain, which in turn is connected to the node between the TFT 24 and capacitor 25.

Figure 4:
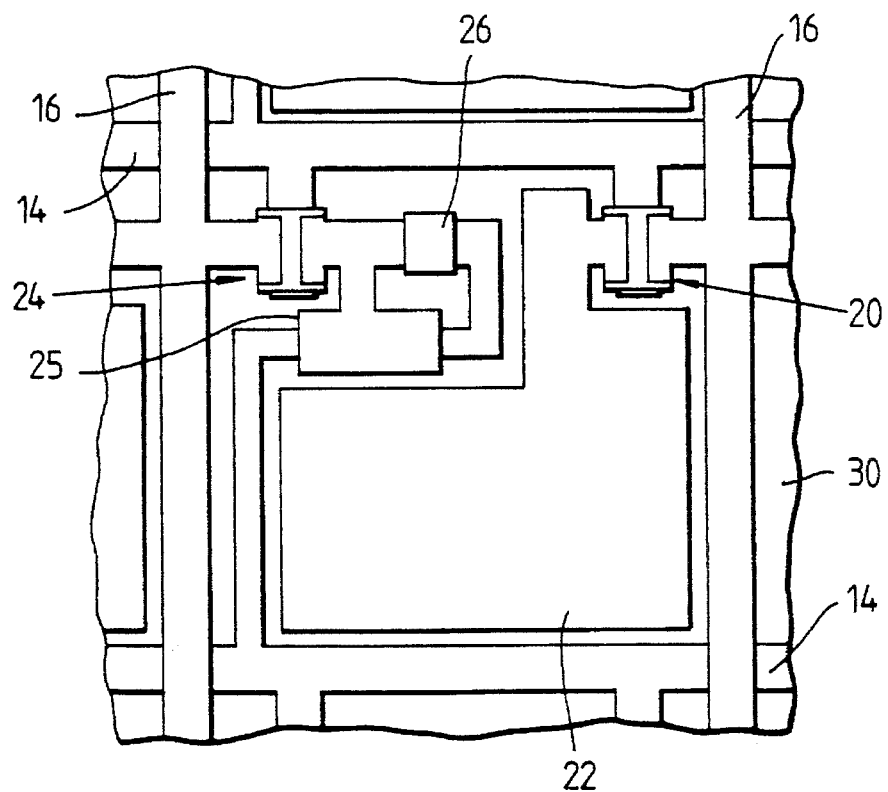
FIG. 4 is a diagrammatic plan view of a picture element and a sensing element of a panel of the display device.

The components 24, 25, and 26 of all the sensing elements in the array, together with their interconnections, are provided on the same supporting plate as the TFTs 20, the first electrodes 22 of the display elements 21, and the sets of row and column address conductors. By way of example only, a configuration of the layout of the components for the combination of sensing element and picture element depicted in FIG. 2 is shown diagrammatically in FIG. 4, in which the supporting plate is referenced at 30. It should be appreciated that many other configurations are possible.

The arrays of picture and sensing elements and the sets of row and column address conductors are fabricated on the supporting plate using technology commonly employed in the manufacture of active matrix liquid crystal display devices. This technology, which typically involves the deposition and definition of superimposed thin film layers, is well established and widely documented and it is not thought necessary therefor to describe in detail such fabrication techniques. Examples of suitable manufacturing processes are described in the aforementioned U.S. Pat. No. 4,345,248, details of which are incorporated herein by reference.

In this particular embodiment the TFTs 20 and 24 comprise hydrogenated amorphous silicon TFTs, and the photoresistors 26 comprise amorphous silicon material. The display element electrodes comprise ITO, and the row and column conductors and the plates of the capacitors 25 comprise metal, for example, aluminium or chromium. Other materials can be used, as will be apparent to persons skilled in the art.

Referring again to FIG. 1, the row address conductors 14 are connected at their one ends to a row drive circuit 34 comprising a digital shift register whose operation is controlled by timing signals provided by a timing and control circuit 35 and which sequentially addresses the row conductors 14 on a row at a time basis. The row drive circuit 34 applies a selection, i.e. gating, signal to each row address conductor 14 in turn, and holds each conductor 14 at a reference potential level in the interval between successive selection signals. The column address conductors 16 are connected at their one ends to a column drive circuit 36, comprising a sample and hold circuit operated by a shift register to perform serial to parallel conversion, to which data in serial form is supplied from the timing and control circuit 35. A data signal for each picture element in a row is provided by the circuit 36 to the column address conductors 16, with data signals for the picture elements of each row in turn being supplied to the conductors 16 in synchronism with the selection signals applied to the row address conductors 14. The circuits 34 and 35 and the manner in which the picture elements are driven follow conventional practice and, accordingly, will not be described in detail herein. The circuit 36 is similarly of conventional form apart from a modification which will be described subsequently. Briefly, the TFTs 20 of the picture elements in a row are turned on by the application of a selection signal to their associated row address conductor whereupon the data signals present on the column address conductors 16 are transferred to the respective display elements 21 of that row. Light transmission through the display elements is modulated in accordance with the level of the applied data signal. Following a row address, and termination of the selection signal, the TFTs 20 are turned off thereby isolating the associated display elements 21 from the conductors 16 so that the display elements remain substantially in the state into which they were driven until the next time they are addressed, i.e. in the subsequent field period. Each display element can produce a range of display effects, i.e. a grey scale. In a variant, the data signals may be binary signals producing a two level display output, light and dark, from the display elements. In this case the column drive circuit can be of simplified form comprising a digital circuit, for example, a shift register circuit with latched outputs.

In order to prevent degradation of the liquid crystal material, the polarity of the drive voltage applied to the display elements is periodically inverted, in accordance with known practice, for example, after every field.

Preferably, for reasons which will become apparent, part of the inverting column conductor data signals is applied to the common electrode 23 of the display elements so that the range of data signal voltages present on the column conductors 16 is minimised.

The other ends of the column address conductors 16 are connected to a detection circuit 40 which comprises a set of sense amplifiers, one for each column conductor, whose function is to provide an output indicative of the state of the sensing elements 18, that is, according to whether or not they have been illuminated, for example, by means of a light pen, referenced at 41 in FIG. 1. The charge state of capacitor 25, e.g. the level of the charge stored in a capacitor 25, is dependent on whether or not the associated photosensitive element 26 has been illuminated. The detection circuit periodically addresses the capacitors 25 to sense their charge state and provides an output in accordance therewith indicating whether or not the capacitors have been subjected to illumination in the interval between successive addressing. The light pen 41, which consists of a light source which continuously emits light in operation, can be moved over the display panel whereby sensing elements located under the path of travel of the light pen are illuminated. The detection of those sensing elements which have been illuminated in this manner, representing the pattern of the light pen movement, enables data or information to be written into the device. The light pen emits a narrow, intense beam of light of a wavelength to which the photosensitive elements 26 of the sensing elements are responsive. If a high resolution input is required, the size of the beam should be sufficiently narrow to illuminate only one sensing element of the array at any given time. The beam should be large enough such that one sensing element is always illuminated. An ideal size would be a beam of diameter approximately equal to the diagonal of the picture/sensing element area.

In order to improve discrimination between signals from written and unwritten sensing elements, the photosensitive elements 26 can be formed so as to have a wavelength dependent photosensitivity which peaks in the region of the spectrum where the light pen output is concentrated. In this case, the light pen may comprise a narrow-band emitter, such as an LED.

Figure 5:
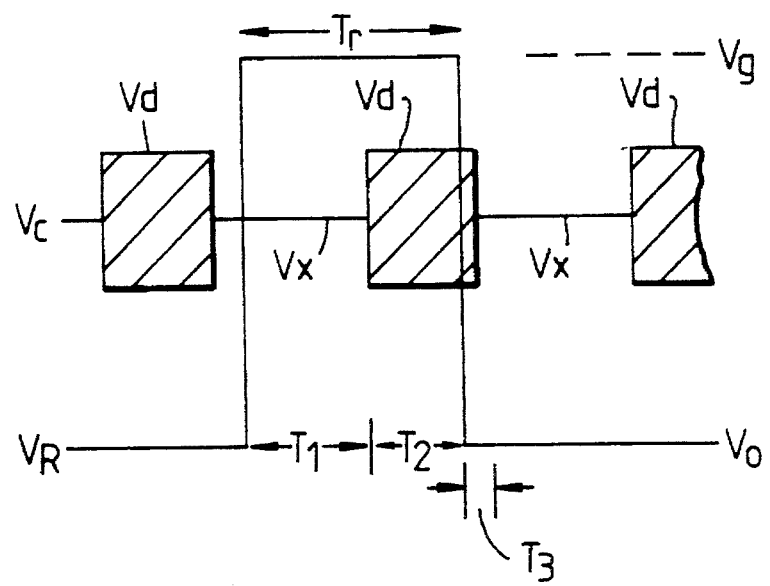
FIG. 5 illustrates the waveforms and relative timing of signals present in operation of the display device.

Examples of the signal waveforms applied to row and column address conductors in operation are illustrated in FIG. 5, in which $V_R$ and Vc are respectively the row and column voltage waveforms. The row selection signal comprises a pulse of duration $T_r$ and magnitude $V_g$. During a first time interval lasting for the remainder of the field period $T_F$, where $T_F$ can be approximately equal to m.Tr, the row conductor is held at a constant reference level $V_0$.

The data signal intended for a picture element is indicated at Vd, having a range of possible values according to the display effect desired, and is applied by the column driver circuit 36 to the column conductor 16 for a part only, shown at T2, of the duration of the selection signal. The column drive circuit is modified so as to present a high impedance to the column conductor in the intervals between successive data signals being applied to the column conductor, and intended for respective picture elements in the column of picture elements associated with the column conductor, and during these intervals a constant predetermined potential, indicated at Vx, is applied to the column conductor by the detection circuit 40. Thus, during a second time interval the first part, T1, of the row selection period Tr for a row address conductor 14, the column drive circuit is switched to a high impedance state and during the latter part, i.e., a third time interval, of the row selection period the data signal Vd is applied to the column conductor 16. As a result the display element 21 of the picture element 12 associated with these row and column conductors is charged to a voltage, $V_{LC}$, given by:

$$V_{LC}=Vd-Ve$$

where Ve is the voltage of the electrode 23 common to all display elements.

The selection signal pulse $V_R$ applied to a row conductor 14 also turns on the TFTs 24 of the row of sensing elements 18 associated with that row conductor. As a result, during the period T2 the capacitors 25 of the row of sensing elements are charged to a voltage according to the voltage present on their respective column conductor with each capacitor 25 being charged to a level, Vs, given by:

$$Vs=Vd-Vo$$

bearing in mind that the other side of the capacitor is connected to the succeeding row address address conductor which at this time is held at the reference level Vo. Since the column voltage Vs can also vary. If the means data signal voltage (Vd) is Vm and the range of possible data signal voltages is 2Vn then Vs can be in the range (Vm+Vn–Vo) to (Vm–Vn–Vo).

Following termination of the row selection signal ($V_R$) the TFTs 24, like the TFTs 20, connected to the row conductor 14 are turned off, thereby isolating the capacitors 25 until the row of sensing elements are next addressed in the subsequent field period. During the interval (i.e., the first time interval) between successive addressing of the sensing elements in a row, corresponding to a field period, their capacitors 25 can be discharged to a greater or lesser extent by photoconduction through their associated photosensitive elements.

At the start of the next row selection pulse signal applied to that row conductor 14, i.e. at the start of period T1 (i.e., the second time interval), when the column drivers are in the high impedance state, the TFTs 20 and 24 of the picture elements and sensing elements of the row are again turned on. The voltage of the column conductors 16 at this time is set by the detection circuit 40 to Vx and the charging current required to charge the capacitors 25 and the display elements 21 to the column voltage Vx flows via the detection circuit 40 where it is sensed. The sensitivity of the photosensitive elements 26 of the elements 18 is chosen so that under normal, ambient, illumination the capacitors 25 are not discharged to any significant extent and accordingly very little charging current flows during this period in the case where the photosensitive elements have been subjected only to ambient illumination in the preceding field period. There will normally be some charging current since a capacitor 25 may have been charged to any voltage in the possible range of data signal voltages Vd on the associated column conductor 16 during the latter part, T2, of the previous row address period and the voltage across the capacitor 25 is now reset to Vx–Vo. The maximum charge flowing into a capacitor 25 will be in the range C(Vx–Vm–Vn)+dQ to C(Vx–Vm+Vn)+dQ, where dQ is the charge needed to replace the leakage caused by ambient illumination incident on the photosensitive element 26 and C is the capacitance.

If, during the preceding field period, a sensing element 18 has been "written" with the light pen 41 then the comparatively high light intensity will have caused the photosensitive element 26 of the sensing element 18 to conduct heavily, thus substantially discharging the capacitor 25 so that a charge C(Vx–Vo) will flow into its capacitor 25.

The sense amplifiers of the detection circuit 40 connected to respective column conductors 16, which may be current or charge sensing amplifiers, are responsive to the charges supplied to the capacitors 25 in the period T1. After amplification in the sense amplifiers the signals produced as a result of the recharging of the capacitors 25 are passed to a respective threshold circuit of the detection circuit 40 whose output switches state if the signal level exceeds a predetermined value which is set to lie between that produced by a "written" and an "unwritten" sensing element.

By selecting Vx so as to lie slightly below Vm–Vn the polarity of the charging signals for written and unwritten sensing elements will be opposite, which can make discrimination between them easier.

Figure 6:
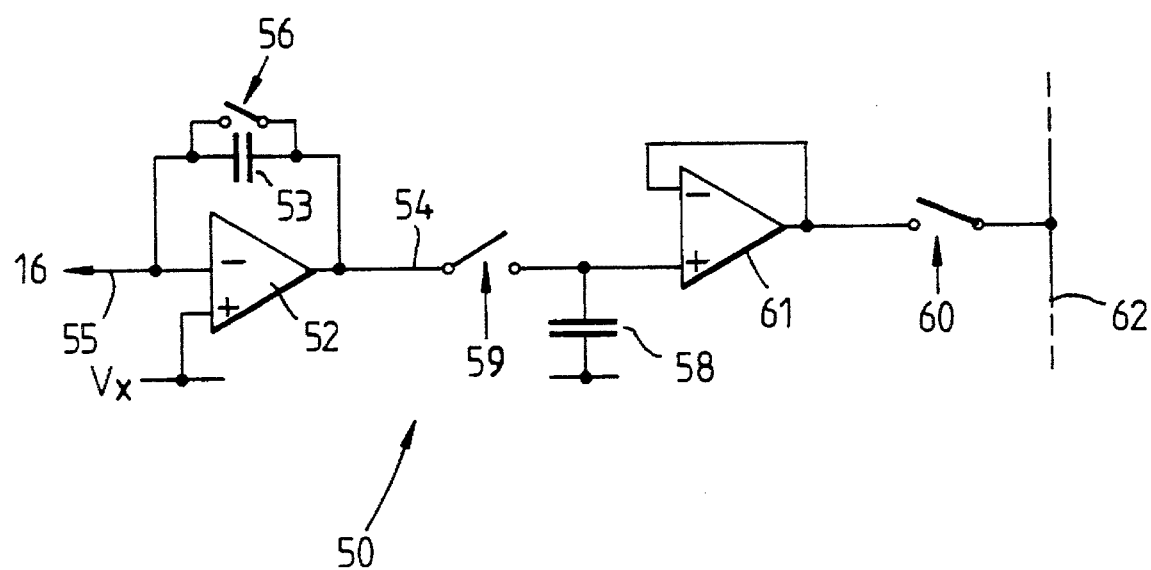
FIG. 6 shows a part of a detection circuit of the display device.

The detection circuit will now be described with reference to FIG. 6 although it should be appreciated that other forms of detection circuit could be employed for sensing the states of the sensing elements. FIG. 6 illustrates schematically the circuit of one stage, 50, of the detection circuit 40 associated with a respective column conductor 16, the circuit 40 having identical stages for other column conductors. The stage 50 consists of a sense amplifier 52, which in this case is a charge sensitive amplifier. During the period T3 (FIG. 5) of a row selection period beginning after the start of the data signal Vd and terminating slightly before the start of the row selection pulse signal Vr for the succeeding row conductor 14, and after termination of Vd, a feedback capacitor 53 of the amplifier 52 is discharged, the amplifier output on line 54 is reset to Vx and the input 55 to the amplifier, connected to the associated column conductor 16, is clamped to the same potential (Vx) by the closure of the electronic switch 56 connected across the capacitor 53. At the end of the period T3 the switch 56 is opened and during the period T1 of this next row address period, in which a subsequent row address conductor is supplied with a selection signal Vr of a magnitude Vg, the signal from the column conductor representing the charge current for a capacitor 25 of the selected sensing element associated with the column conductor is integrated by the sense amplifier 52 and its associated capacitor 53. Near the end of this period T1 the resulting, integrated, output signal on line 54 is transferred to capacitor 58 by closing the electronic switch 59 for a short period. The switch 59 is then opened before the beginning of period T2, isolating the capacitor 58 from the sense amplifier 52, and therefore from the effects of the data signal, Vd, which is then applied to the column conductor. During this period, T2, the signals from the stages of the detection circuit 40 associated with every column conductor can be read out sequentially via respective buffers 61, by closing the switches 60 for each stage in turn, so as to achieve a parallel to serial conversion, with the serial output of the detection circuit 40 being provided on the output line 62. The timing of the operation of the switches 56, 59 and 60 is controlled by the circuit 35.

The serial output on line 62 is fed to a discriminator, for example a threshold level detector, whose binary output has first and second levels representing the two possible states of the sensing elements, e.g. written or unwritten. The output of the detection circuit 40 may be supplied to one input of a data processing circuit, with an associated memory device, which provides signals to the column driver circuit for display purposes, in a similar manner to that described in U.S. Pat. No. 4,345,248.

This operation of the detection circuit is repeated for each row of sense elements, in synchronism with the addressing of the rows of picture elements, so that the states of the array of sensing elements are determined over the course of the display field, the array being repeatedly addressed in this manner in successive display fields.

In another form of the detection circuit, each stage may include a respective threshold detector. Most conveniently, this can be achieved by including the thresholding function in the amplifier circuit 61. The switch 60 can then be a digital switch and the output provided on line 62 digital rather than analogue. Several parallel output lines 62 may be provided, each of which is connected with certain stages only, for example, every eighth stage, so that a parallel output is obtained. The serial data rate in each output line 62 is then considerably reduced compared with that for a single output line.

Various modifications to the device are possible. For example, as mentioned previously, the capacitors 25 and photosensitive elements 26 of a row of sensing elements 18 may be connected at their sides remote from the TFTs 24 to a respective supplementary row conductor to which a reference potential Vo is continuously applied rather than to the next row address conductor 14.

It is envisaged that the photosensitive element 26 and capacitor 25 of each sensing element need not be provided as separately formed components as described previously, but may instead be integrated into one component, for example, as a photoconductive element having a self capacitance adequate to satisfy the operational requirements described above.

By sensing the ambient light level using a separate photosensor situated on the panel outside of the display area or using a signal derived from the average of all sensing element outputs over the last field, compensation may be achieved for the part of the output signal produced by the discharge of the capacitors 25 caused by ambient illumination (i.e. dQ).

If a high resolution input capability is not required, then the number of sensing elements in the array can be reduced, for example, with a sensing element being provided for every two, three or four picture elements.

We claim:

1. An active matrix liquid crystal display device comprising: a display panel having an array of picture elements each comprising a liquid crystal display element and an associated switching means, a set of row address conductors and a set of column address conductors connected to the picture elements, drive means for applying drive signals to the set of row address conductors and to the set of column address conductors for driving the picture elements, said drive means being arranged to apply data signals to the column address conductors and a selection signal to each row address conductor individually in turn so as to operate the switching means of the picture elements associated with the selected row address conductor thereby to apply the data signals to their respective display elements, the display panel further including an array of active addressed sensing elements each comprising a photosensitive element and a switching device, wherein the sensing elements each include a charge storage means which is connected to the switching device, wherein the switching devices of each row of sensing elements are each connected to a said row address conductor and a said column address conductor and are operable by a said selection signal applied to an associated row address conductor of said set of row address conductors so as to charge the charge storage means of the sensing elements according to the level of the data signals, wherein the photosensitive element of each sensing element is connected so as to discharge the charge storage means in response to the illumination thereof, and detection means connected to the sensing elements for periodically detecting the state of charge of their respective charge storage means.

2. An active matrix liquid crystal display device according to claim 1, wherein the charge storage means of each sensing element comprises a capacitor connected between the switching device of the sensing element and a row address conductor adjacent that row address conductor associated with the switching device of the sensing element.

3. An active matrix liquid crystal display device according to claim 1, wherein the charge storage means of each sensing element comprises a capacitor connected between the switching device of the sensing element and a source of predetermined potential comprising an auxiliary row conductor other than the row address conductors of said set of row address conductors and which is common to all sensing elements in a row.

4. An active matrix liquid crystal display device according to claim 1 wherein the detection means is arranged to determine the state of the sensing element charge storage means during a display field.

5. An active matrix liquid crystal display device according to claim 4 wherein the detection means is arranged to detect the state of charge of the charge storage means of a sensing element by measuring a charging characteristic of the charge storage means in response to the application thereto by an associated column address conductor of a predetermined potential.

6. An active matrix liquid crystal display device according to claim 1, wherein the switching means of a row of picture elements and the switching devices of a row of associated sensing elements are switched by selection signals of a same row address conductor and the detection means is operable to determine the state of the charge storage means of a row of sensing elements associated with said same row address conductor each time a drive signal is applied by the drive means to that row address conductor.

7. An active matrix liquid crystal display device according to claim 1 wherein during each row address period the drive means is arranged to apply a selection signal to the row address conductor and data signals to the column address conductors to drive the picture elements, wherein a row address period is defined by the duration of the selection signal applied to a row address conductor and is divided into a detection interval during which the detection means is operable to detect the state of a sensing element associated with that row address conductor followed by a drive interval during which the drive means is operable to apply data signals to the associated row of picture elements via the column address conductors.

8. An active matrix liquid crystal display device according to claim 1 wherein the device further comprises a light emitting means movable over the array of sensing elements so as to illuminate the photo-sensitive elements thereof, and wherein the photo-sensitive elements have a wavelength dependent photosensitivity which peaks substantially in a region of the spectrum at which the output of the light emitting means is concentrated.

9. An active matrix liquid crystal display device according to claim 1, wherein during each row address period the drive means is arranged to apply a selection signal to a row address conductor and data signals to the column address conductors and the switching means and the switching devices of a selected row are switched by the same selection signal, wherein each row address period is defined by the duration of the selection signal applied to a row address conductor and is divided into a detection interval during which the detection means is operable to detect the state of a sensing element associated with that row address conductor followed by a drive interval during which the drive means is operable to apply data signals to the row of picture elements via said column address conductors.

10. An active matrix liquid crystal display device according to claim 9, wherein the detection means is connected to the column address conductors so as to detect the state of charge of the charge storage means of a sensing element by measuring a charging characteristic of the charge storage means in response to the application thereto of a predetermined potential via its switching device and its associated column conductor.

11. An active matrix liquid crystal display device according to claim 1 further comprising a light pen for selectively illuminating said photo-sensitive element, and wherein said drive means periodically apply drive signals to said address conductors thereby to recharge selected charge storage means via their associated switching devices.

12. An active matrix liquid crystal display device according to claim 1 wherein a single set of row address conductors and a single set of column address conductors apply drive signals to both the display elements and the charge storage means via the associated switching means and the switching devices, respectively.

13. A display device comprising:
a matrix array of picture elements each of which includes an electro-optical display element connected to a first switching device,
a plurality of row and column address conductors coupled to the picture elements,
drive means for periodically applying drive selection signals to the row address conductors and data signals to the column address conductors for selectively driving rows of picture elements in turn according to the data signals,
an array of sensing elements each comprising a photosensitive element, a second switching device, and a charge storage means coupled to the photosensitive element and to a respective column address conductor via its respective second switching device, said sensing element being coupled to said row and column address conductors so that the second switching devices are operated by said drive selection signals applied to the row address conductors so as to selectively charge the charge storage means according to the level of said data signals on the column address connectors, wherein the photosensitive element of each sensing element is connected so as to discharge its charge storage means in response to illumination of said photosensitive element during a first time interval, and detection means connected to the sensing elements so as to periodically detect the state of charge of the respective charge storage means of the sensing elements during a second time interval.

14. A display device as claimed in claim 13 wherein the drive means periodically apply drive selection signals to the row address conductors one row at a time so as to turn on the first and second switching devices of a selected row thereby to define a sequence of row drive intervals, said detection means being operative during a part of a row drive interval to apply a constant predetermined voltage to the selected charge storage means via the column address conductors and the second switching devices so as to recharge any discharged charge storage means in the selected row, and wherein the drive means selectively apply data signals to the selected row display elements via the column address conductors during another part of the same row drive interval.

15. A display device as claimed in claim 13 wherein the drive means periodically apply drive selection signals to the row address conductors on row conductor at a time so as to simultaneously turn on the first and second switching devices or as, said drive means being operative to apply data signals to the electro-optical display elements via column address conductors during a first portion of said drive selection signal.

16. A display device as claimed in claim 15 wherein, during a second portion of the same drive selection signal, the detection means apply a given voltage to the charge storage means via the column address conductors and the second switching device whereby the detection means detects the state of charge of the charge storage means as a function of charge current flow to the charge storage means.

17. A display device as claimed in claim 13 wherein the drive means periodically apply drive selection signals to the row address conductors one row at a time so as to simultaneously turn on the first and second switching devices of a selected row thereby to define a sequence of row-drive intervals, wherein said row drive intervals are each divided into a detection interval during which the detection means is operable to detect the state of each sensing element associated with that row address conductor as a function of the charge state of the respective charge storage means, followed by a drive interval during which the drive means is operable to apply data signals to the row of picture elements and to the respective charge storage means via the column address conductors.

18. A display device as claimed in claim 13 wherein for each picture element the first switching device and the electro-optical display element are serially connected to respective column address conductor and with a control electrode of the first switching device connected to a respective row address conductor, and for each sensing element the second switching device is serially connected with a parallel combination of the photosensitive element and the charge storage means between a respective column address conductor and an associated row conductor and with a control electrode of the second switching device connected to said respective row address conductor so that the first and second switching devices are operative in synchronism.

19. A display device as claimed in claim 18, wherein said associated row conductor comprises an auxiliary row conductor common to all sensing elements in a row and adapted to supply a predetermined voltage to the charge storage means in said row when the second switching device is turned on.

20. A display device as claimed in claim 13, wherein a charge storage means discharged during the first time interval is selectively charged during a third time interval via operation of its second switching device, said second and third time intervals occurring during a same selected row drive interval.

21. A display device as claimed in claim 13, wherein the drive means periodically apply drive selection signals to the row address conductors one row at a time so as to define a sequence of row drive intervals, said detection means being operative to apply during a first part of a row drive interval a fixed charge voltage to the charge storage means of a selected row via the second switching device, and wherein, during a second part of said row drive interval, data signals are applied to the display elements of the selected row via the column address conductors and operation of the first switching devices.

22. An active matrix liquid crystal display device comprising: a display panel having an array of picture elements each comprising a liquid crystal display element and an associated switching means, a set of row address conductors and a set of column address conductors connected to the picture elements, drive means for applying drive signals to the set of row address conductors and to the set of column address conductors for driving the picture elements, the display panel further including an array of active addressed sensing elements each comprising a photosensitive element and a switching device, characterised in that the sensing elements each include a charge storage means which is connected to the switching device, in that the switching devices are operable by the drive signals applied to said row and column address conductors so as to charge the charge storage means, in that control electrodes of the switching means and the switching devices in a given row of display elements are connected to a common row address conductor whereby the switching means and the switching devices of said given row are simultaneously activated into conduction by a drive signal applied to said common row address conductor, in that the photosensitive element of each sensing element is connected so as to discharge the charge storage means in response to the illumination thereof, and detection means connected to the sensing elements for periodically detecting the state of charge of their respective charge storage means.

23. An active matrix liquid crystal display device according to claim 22 wherein data signals are selectively applied from said column address conductors to both the display elements and the charge storage means via the associated switching means and switching devices, respectively.

24. A display device as claimed in claim 13 wherein said drive means operate said first and second switching devices so that the charge storage means and the display elements of a selected row are both charged during a same row selection period.

25. A display device as claimed in claim 13 wherein said drive means operate said first and second switching devices so that a given voltage is applied to said charge storage means and the display elements of a selected row via said column address conductors and during a same row selection period.

\* \* \* \* \*